(12) United States Patent
Gokita (10) Patent No.: US 8,430,593 B2
(45) Date of Patent: Apr. 30, 2013

(54) TWO-MEMBER CONNECTION STRUCTURE FOR WORKING MACHINE

(75) Inventor: Osamu Gokita, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 241 days.

(21) Appl. No.: 12/681,436

(22) PCT Filed: Oct. 2, 2008

(86) PCT No.: PCT/JP2008/067947
§ 371 (c)(1),
(2), (4) Date: Apr. 2, 2010

(87) PCT Pub. No.: WO2009/044821
PCT Pub. Date: Apr. 9, 2009

(65) Prior Publication Data
US 2010/0209181 A1    Aug. 19, 2010

(30) Foreign Application Priority Data

Oct. 5, 2007 (JP) ................................. 2007-261959

(51) Int. Cl.
*F16C 11/00* (2006.01)
(52) U.S. Cl.
USPC .......................................... 403/151; 37/403
(58) Field of Classification Search .................. 403/150, 403/151, 154, 156, 157, 158, 159; 37/443, 37/403; 414/705, 722
See application file for complete search history.

(56) References Cited

U.S. PATENT DOCUMENTS

| | | | | |
|---|---|---|---|---|
| 1,777,340 A | * | 10/1930 | Wallden | 403/151 |
| 3,129,966 A | * | 4/1964 | Blank | 403/156 |
| 3,600,015 A | * | 8/1971 | McMullen | 403/156 |
| 4,382,744 A | * | 5/1983 | Klem et al. | 414/712 |
| T103302 I4 | * | 8/1983 | Kerkman | 414/722 |
| 4,398,862 A | | 8/1983 | Schroeder | |
| 4,652,167 A | * | 3/1987 | Garman | 403/158 |

(Continued)

FOREIGN PATENT DOCUMENTS

| JP | 7-331689 A | 12/1995 |
|---|---|---|
| JP | 9-177125 A | 7/1997 |

(Continued)

OTHER PUBLICATIONS

International Search Report dated Nov. 11, 2008 including English translation (Three (3) pages).
The Extended European Search Report dated Oct. 23, 2012 (Five (5) pages).

*Primary Examiner* — Michael P Ferguson
(74) *Attorney, Agent, or Firm* — Crowell & Moring LLP (57) ABSTRACT

A two-member connection structure is provided with a boom to be arranged on a hydraulic excavator, an arm arranged inboard the boom, outboard bushings and inboard bushings press-fit in pin holes of the boom and arm, respectively. A connector pin is inserted in holes of the outboard bushings and holes of the inboard bushings to connect the boom and arm as two members for relative pivotal movement. Flange portions are integrally arranged on opposite end portions of the connector pin, respectively, to restrict slip-out of the connector pin. The connector pin is arranged rotatably relative to both of the outboard bushings and the inboard bushings, and the flange portions are arranged slidably relative to outboard end faces of the corresponding outboard bushings without being prevented from rotation relative to the boom.

2 Claims, 5 Drawing Sheets

U.S. PATENT DOCUMENTS

| | | | |
|---|---|---|---|
| 4,961,667 A * | 10/1990 | Reinsma et al. | 403/158 |
| 5,630,673 A * | 5/1997 | Krzywanos et al. | 403/158 |
| 6,283,667 B1 * | 9/2001 | Neitzel | 403/158 |
| 6,962,458 B2 * | 11/2005 | Takayama et al. | 403/150 |
| 2003/0150140 A1 | 8/2003 | Takayama et al. | |
| 2004/0060210 A1 | 4/2004 | Nishimura et al. | |
| 2004/0228676 A1 | 11/2004 | Oertley | |

FOREIGN PATENT DOCUMENTS

| | | |
|---|---|---|
| JP | 11-21940 A | 1/1999 |
| JP | 2004-162292 A | 6/2004 |
| JP | 2005-30500 A | 2/2005 |
| WO | WO 98/02618 A2 | 1/1998 |

* cited by examiner

TWO-MEMBER CONNECTION STRUCTURE FOR WORKING MACHINE

TECHNICAL FIELD

This invention relates a two-member connection structure for a working machine, which can connect two members, such as a boom and an arm or an arm and a bucket in a hydraulic excavator, for relative pivotal movement via a connector pin.

BACKGROUND ART

Figure 5A:
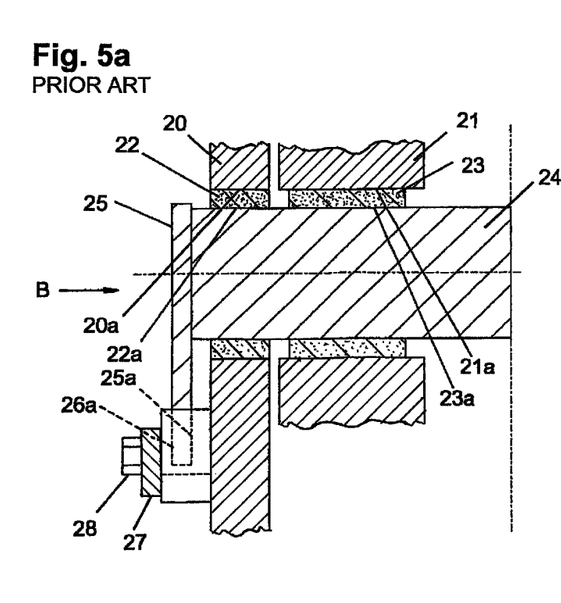
FIG. 5A is a fragmentary cross-sectional view and FIG. 5B is a view as seen in the direction of arrow B in FIG. 5A.
Figure 5B:
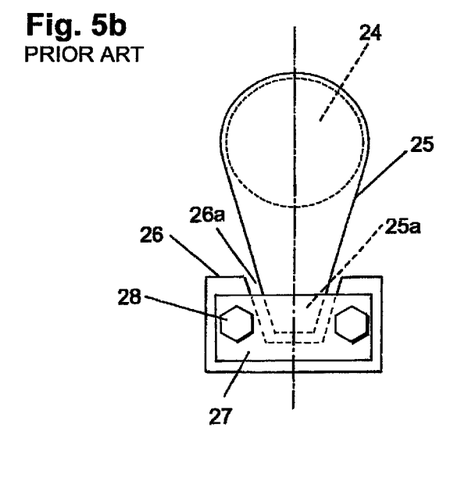

FIGS. 5A and 5B are views illustrating one example of conventional two-member connection structures for working machines, in which FIG. 5A is a fragmentary cross-sectional view and FIG. 5B is a view as seen in the direction of arrow B in FIG. 5A. It is to be noted that FIG. 5A illustrates only a left half.

FIGS. 5A and 5B illustrate a connection structure for two members disposed in a working machine such as a hydraulic excavator, for example, each outboard member, e.g., a bucket 20 and each inboard member, e.g., an arm 21 arranged inboard the bucket 20. An outboard bushing 22 is press-fitted in a pin hole 20a of the bucket 20, and an inboard bushing 23 is press-fitted in a pin hole 21a of the arm 21. Inserted in a hole 22a of the outboard bushing 22 and a hole 23a of the inboard bushing 23 is a connector pin 24, that connects the two parts of bucket 20 and arm 21 for relative pivotal movement. Flange portions 25 are arranged on opposite end portions of the connector pin 24, respectively, such that the flange portions 25 are integral with the connector pin 24 to restrict slip-out of the connector pin 24 from the bucket 20 and arm 21.

Further, on an outboard side wall of the bucket 20, a stopper 26 having a recess 26a of a shape corresponding to a tapered shape of a free end part 25a of the flange portion 25 is arranged as also depicted in FIG. 5B, and on an upper wall of the stopper 26, a plate 27 or the like is secured by bolts 28. The stopper 26, plate 27 and the like make up a mechanism for restricting rotation and slip-out of the flange portion 25 and connector pin 24, in other words, a rotation and slip-out preventing mechanism for the connector pin 24. An unillustrated right half of a center line in FIG. 5A has a structure symmetrical to the left half without the rotation and slip-out preventing mechanism for the connector pin 24, said mechanism being included in the left half and being composed of the flange portion 25, stopper 26, plate 27 and bolts 28. It is to be noted that a technology equivalent to the conventional technology illustrated in FIGS. 5A and 5B is disclosed in JP-A-7-331689

DISCLOSURE OF THE INVENTION

Problem to be Solved by the Invention

In the above-described conventional technology illustrated in FIGS. 5A and 5B, large force is applied to an area of engagement between the free end part 25a of the flange portion 25 and the recess 26a of the stopper 26 via the connector pin 24 and flange portion 25 as a result of relative pivotal movement between the bucket 20 and the arm 21 if a deterioration occurs in the conditions of lubrication between the inboard bushing 23 for the arm 21 and the connector pin 24. It is, therefore, necessary to provide the flange portion 25 and stopper 26 with greater strength.

In the above-described technology, the force to be applied to the stopper 26 can be reduced by setting the length of the flange portion 25 longer. However, the flange portion 25 of such a longer length tends to result in a greater bending deformation of the flange portion 25 when force that would cause the connector pin 24 to slip out is borne at the flange portion 25. For the prevention of such a bending deformation of the flange portion 25, it is, therefore, necessary to provide the flange portion 25 with greater strength. It is also necessary to provide the area of joining between the connector pin 24 and the flange portion 25 with greater strength, because the large force applied to the area of engagement between the flange portion 25 and the stopper 26 as mentioned above is also applied to the area of joining.

As mentioned above, the conventional technology requires to design the flange portion 25, the stopper 26 and the area of joining between the connector pin 24 and the flange portion 25 with greater strength beforehand in view of the large force to be applied to the area of engagement between the flange portion 25 and the stopper 26 or the like upon deterioration of the conditions of lubrication. The fabrication of the two-part connection structure, therefore, tends to become complex and to require higher cost.

With the above-mentioned circumstances of the conventional technology in view, the present invention has as an object the provision of a two-part connection structure for a working machine, which can hold outboard members and their corresponding inboard members for relative pivotal movement without arrangement of stoppers for restricting rotation of flange portions and a connector pin.

Means for Solving the Problem

To achieve the object, the present invention is characterized in that in a two-member connection structure for a working machine, the structure is provided with outboard members to be arranged on the working machine, inboard members arranged inboard the respective outboard members, outboard bushings press-fitted in pin holes of the respective outboard members, inboard bushings press-fitted in pin holes of the respective inboard members, a connector pin inserted in holes of the outboard bushings and holes of the inboard bushings to connect the outboard members and inboard members as two kinds of members for relative pivotal movement, and flange portions integrally arranged on opposite end portions of the connector pin, respectively, to restrict slip-out of the connector pin from the outboard members and inboard members. The connector pin is arranged rotatably relative to both of the outboard bushings and the inboard bushings, and the flange portions are arranged slidably relative to outboard end faces of the corresponding outboard bushings without being prevented from rotation relative to the outboard members.

In the present invention configured as described above, each outboard bushing press-fitted in the corresponding outboard member and the connector pin are allowed to pivot and rotate, respectively, relative to each other and each flange portion arranged integrally with the connector pin is allowed to slide relative to and on and along the outboard end face of the corresponding outboard bushing without being prevented from rotation, both as a result of relative pivotal movement between the outboard member and the corresponding inboard member, even when a deterioration occurs in the conditions of lubrication, for example, between the inboard bushing for the inboard member and the connector pin. Accordingly, no large force is applied to the flange portion or the area of joining between the connector pin and the flange portion as a result of the above-mentioned deterioration of the conditions of lubrication. The outboard member and the inboard member can, therefore, be held for relative pivotal movement without arrangement of a stopper for restricting rotation of the connector pin and flange portion. As a consequence, the strength of the flange portion and that of the area of joining between the connector pin and the flange portion can be set low.

The present invention is also characterized in that in the invention as described above, the flange portions are set in such a shape and dimensions that the flange portions are located opposite the outboard end faces of the corresponding outboard bushings but are not located opposite outboard side walls of the corresponding outboard members. In the present invention configured as described above, each flange portion comes into contact with the outboard end face of the corresponding outboard bushing when slip-out force is applied to the connector pin. The above-mentioned force that would cause the connector pin to slip out is, however, borne at the corresponding outboard member because the outboard bushing is press-fitted in the outboard member and is held integrally with the outboard member. It is, therefore, possible to prevent slip-out of the connector pin.

The present invention is also characterized in that in the invention as described above, the outboard bushings are arranged such that the outboard end faces of the outboard bushings are located remote from the outboard side walls of the corresponding outboard members in a direction of an axis of the connector pin. In the present invention configured as described above, each flange portion can be shaped to have a part protruding beyond the outboard end face of the corresponding outboard bushing in a direction of a radius of the connector pin. Even when the flange portion is one having the part protruding beyond the outboard end face of the outboard bushing in the direction of the radius as described above, the protruding part does not come into contact with the outboard side wall of the outboard member so that the flange portion can be provided with greater flexibility in shape.

The present invention is also characterized in that in the invention as described above, the flange portions have the parts protruding beyond the outboard end faces of the corresponding outboard bushings in the direction of the radius of the connector pin, and seal members are arranged to provide sealing between the protruding parts of the flange portions and the outboard side walls of the corresponding outboard members. In the present invention configured as described above, each seal member prevents external dust and the like from penetrating into an area of sliding between the corresponding flange portion and the outboard end face of the corresponding outboard bushing and also external dust and the like into an area of sliding between the hole of the outboard bushing and the connector pin, thereby making it possible to assure smooth pivotal movement of the outboard member over a long term.

The present invention is also characterized in that the outboard bushings are formed of one having self-lubricating properties at both of inner circumferential surfaces thereof, which define the corresponding holes in which the connector pin is inserted, and the outboard end faces thereof. In the present invention configured as described above, smooth sliding motion can be performed at both of the area of sliding between the connector pin and the hole of each outboard bushing and the area of sliding between the flange portion and the outboard end face of the outboard bushing, so that stable pivotal movement of the corresponding outboard member can be realized over a long term.

Advantageous Effects of the Invention

According to the present invention, the connector pin that connects the outboard members and the corresponding inboard member to each other is arranged rotatably relative to both of the outboard bushings arranged in the outboard members and the inboard bushings arranged in the inboard members, and the flange portions are arranged slidably relative to the outboard end faces of the corresponding outboard bushings without being prevented from rotation relative to the corresponding outboard members. Therefore, the outboard members and their corresponding inboard members can be held for relative pivotal movement without needing stoppers that restrict rotation of the flange portions and connector pin. Moreover, no large force is applied to the flange portions or the areas of joining between the connector pin and the flange portions as a result of a deterioration of the conditions of lubrication. The strength of each flange portion and that of the area of joining between the connector pin and each flange portion can, therefore, be set lower than those in the conventional technology. As a consequence, its fabrication has become easier compared with that of the conventional technology, and including the obviation of the cost heretofore required as a result of the arrangement of stoppers, the fabrication cost can be reduced.

BRIEF DESCRIPTION OF THE DRAWINGS

FIG. 5 includes views illustrating one example of conventional two-member connection structures for working machines, in which

BEST MODES FOR CARRYING OUT THE INVENTION

Based on the drawings, a description will hereinafter be made of best modes for carrying out the two-part connection structure according to the present invention for the working machine.

Figure 1:
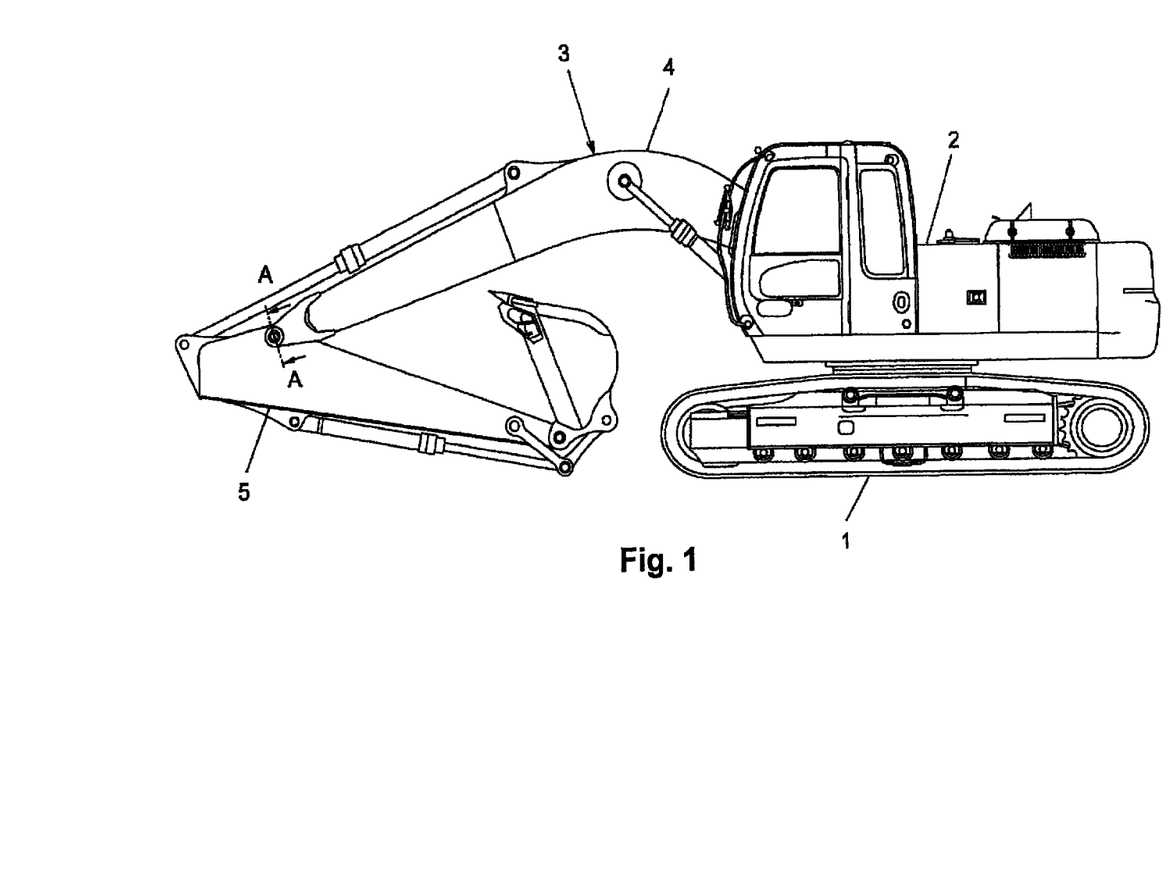
FIG. 1 is a side view illustrating a hydraulic excavator as one example of a working machine on which a first embodiment of the two-member connection structure according to the present invention can be arranged.
Figure 2:
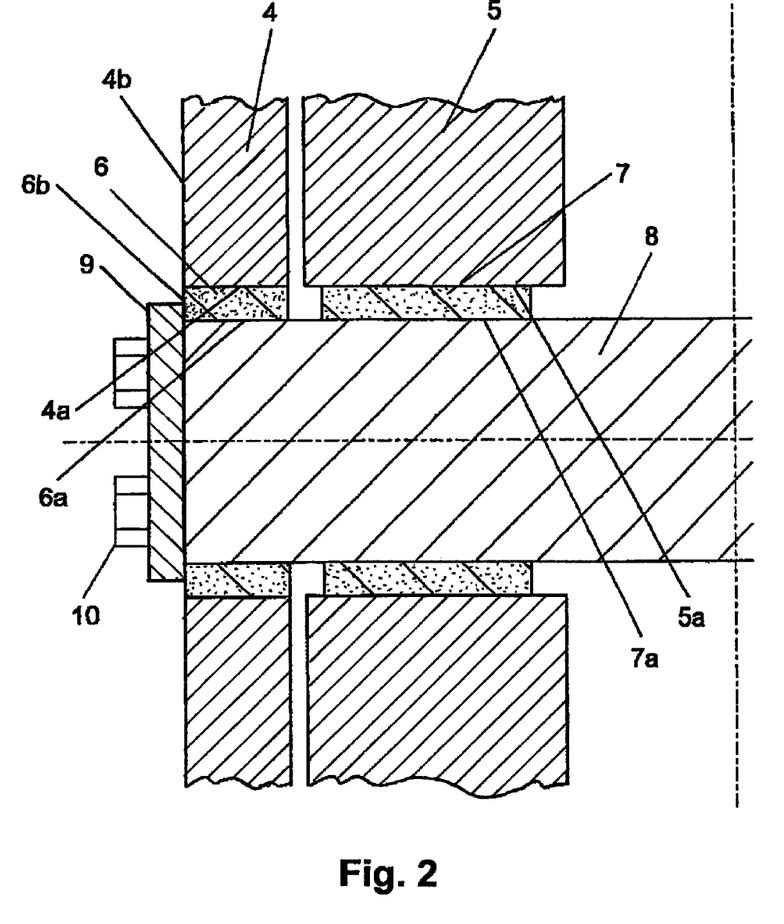
FIG. 2 is an enlarged fragmentary view of an A-A section of FIG. 1.

FIG. 1 is a side view of a hydraulic excavator illustrated as one example of the working machine on which a first embodiment of the two-member connection structure according to the present invention can be arranged, and FIG. 2 is an enlarged fragmentary view of an A-A section of FIG. 1. It is to be noted that FIG. 2 shows only a left half. Although illustration is omitted in the figure, a right half has a symmetrical structure to the left half with respect to a center line.

The working machine on which the two-member connection structure according to the prevention can be arranged, for example, a hydraulic excavator is provided, as shown in FIG. 1, with a travel base 1, a revolving upperstructure 2 mounted on the travel base 1, and a front working mechanism 3 secured pivotally in an up-and-down direction to the revolving upperstructure 2 to permit digging work or the like. The front working mechanism 3 is provided with a boom 4 pivotally secured to the revolving upperstructure 2 and an arm 5 pivotally attached to a free end of the boom 4.

As depicted in FIG. 2, the boom 4 and arm 5 are connected for relative pivotal movement, with the boom 4 and arm 5 being arranged outboard and inboard, respectively. Namely, the boom 4 constitutes the outboard members in the two-member connection structure, while the arm 5 constitutes the inboard members in the two-member connection structure.

In a pin hole 4a of the boom 4, an outboard bushing 6 is press-fitted, and in a pin hole 5a of the arm 5, an inboard bushing 7 is press-fitted. In a hole 6a of the outboard bushing 6 and a hole 7a of the inboard bushing 7, a connector pin 8 is inserted connecting the boom 4 and arm 5 as two members for relative pivotal movement.

The above-mentioned outboard bushing 6 and inboard bushing 7 are formed, for example, of one having self-lubricating properties such as an oil-impregnated sintered metal. In particular, the outboard bushing 6 is formed of one having self-lubricating properties at both of an inner circumferential surface, which defines the hole 6a in which the connector pin 8 is inserted, and an outboard end face 6b.

On opposite end portions of the connector pin 8, flange portions 9 are arranged, respectively, to restrict slip-out of the connector pin 8 from the boom 4 and arm 5, and these flange portions 5 are integrally fastened to their corresponding end faces of the connector pin 8 by bolts 10.

Specifically in this first embodiment, the connector pin 8 is arranged rotatably relative to both of the outboard bushing 6 and the inboard bushing 7, and the flange portions 9 are arranged slidably relative to the outboard end faces 6b of the corresponding outboard bushings 6 without being prevented from rotation relative to the boom 4.

As shown in FIG. 2, the outboard end face 6b of the outboard bushing 6 is set in flush, for example, with an outboard side wall 4b of the boom 4. Further, the flange portion 9 is set in such a shape and dimensions that the flange portion 9 is located opposite the outboard end face 6b of the outboard bushing 6 but is not located opposite the outboard side wall 4b of the boom 4.

When the arm 5 is driven in the first embodiment configured as described above, the arm 5 and the connector pin 8 pivot and rotate, respectively, relative to each other via the area of sliding between the hole 7a of the inboard bushing 7, which is press-fitted in and integrally arranged with the arm 5, and the connector pin 8. When the boom 4 is driven, on the other hand, the boom 4 and the connector pin 8 pivot and rotate, respectively, relative to each other via the area of sliding between the hole 6a of the outboard bushing 6, which is press-fitted in and integrally arranged with the boom 4, and the connector pin 8 and also the area of sliding between the outboard end face 6b of the outboard bushing 6 and the flange portion 9. Responsive to these drives of the arm 5 and boom 4, the front working mechanism 3 is driven to perform desired digging work or the like.

Even when a deterioration occurs, for example, in the conditions of lubrication between the inboard bushing 7 for the arm 4 and the connector pin 8, a relative pivotal movement between the boom 4 and the arm 5 allows the boom 4 and the connector pin 8 to pivot and rotate, respectively, relative to each other owing to the self-lubricating properties of the outboard bushing 6 and also allows the flange portion 9, which is integrally arranged with the connector pin 8, to slide relative to and on and along the outboard end face 6b of the outboard bushing 6 without being prevented from rotation. No large force is, therefore, applied to the flange portion 9 and the area of joining between the connector pin 8 and the flange portion 9 as a result of the above-mentioned deterioration in the conditions of lubrication. Accordingly, the boom 5 and the arm 4 can be held pivotally relative to each other without arranging any stopper that would otherwise be needed to restrict rotation of the connector pin 8 and flange portion 9. As a consequence, the strength of the flange portion 9 and that of the area of joining between the connector pin 8 and the flange portion 9 can be set lower. Therefore, its fabrication has become easier, and including the obviation of the cost required as a result of the arrangement of stoppers, the fabrication cost can be reduced. If wear is caused on the connector pin 8, inboard bushing 7 and/or outboard bushing 6 by long-term use, the connector pin 8, inboard bushing 7 and/or outboard bushing 6 can be easily pulled out by loosening the bolts 10 and detaching the flange portion 9 from the end face of the connector pin 8, and can then be replaced by the corresponding fresh one or ones.

When force that would pull out the connector pin 8 is applied during drive of the arm 5 and/or boom 4, the flange portion 9 is brought into contact with the outboard end face 6b of the outboard bushing 6. The force that would pull out the connector pin 8 is borne at the boom 4 because the outboard bushing 6 is press-fitted in the boom 4 and is held integrally with the boom 4. Therefore, the connector pin 8 can be prevented from slipping out, and a structure of high reliability can be assured.

As the outboard bushing 6 press-fitted in the pin hole 4a of the boom 4 has self-lubricating properties at both of the inner circumferential surface, which defines the hole 6a in which the connector pin 6 is inserted, and the outboard end face 6b, smooth sliding movement can be performed at each of the area of sliding between the connector pin 8 and the hole 6a of the outboard bushing 6 and the area of sliding between the flange portion 9 and the outboard end face 6b of the outboard bushing 6, thereby making it possible to perform stable pivotal movement of the boom 4 over a long time.

As the outboard end face 6b of the outboard bushing 6 is set in flush with the outboard side wall 4b of the boom 4, the amounts of outboard protrusions of the flange portion 9 and bolts 10 can be limited to small values.

If the outer diameter of the flange portion 9 is set substantially equal to the outer diameter of the outboard bushing 6 within a range that the flange portion 9 does come into contact with the outboard side wall 4b of the boom 4, the outboard bushing 6 is not exposed to the outside and is not exposed to rain water, earth, sand and the like. Therefore, the corrosion and wear of the outboard bushing 6 can be controlled over a long term to achieve improvements in durability.

Figure 3:
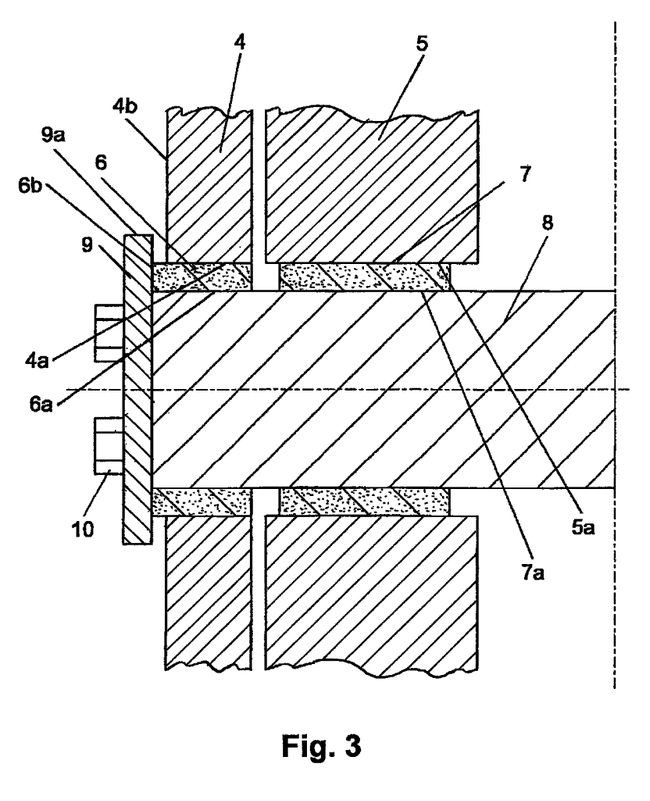
FIG. 3 is an enlarged fragmentary cross-sectional view showing a second embodiment of the two-member connection structure according to the present invention.

FIG. 3 is an enlarged fragmentary cross-sectional view showing a second embodiment of the two-member connection structure according to the present invention. It is to be noted that FIG. 3 also shows only a left half. Although illustration is omitted in the figure, a right half has a symmetrical structure to the left half with respect to a center line.

The second embodiment shown in FIG. 3 is configured such that the outboard bushing 6 is arranged such that the outboard end face 6b of the outboard bushing 6 is located remote from the outboard side wall 4b of the boom 4 as the outboard member in the direction of the axis of the connector pin 8, and also that the flange portion 9 arranged integrally on the end face of the connector pin 8 via the bolts 10 has a protruding part 9a protruding beyond the outboard end face 6b of the outboard bushing 6 in the direction of the radius of the connector pin 8. The remaining construction is equivalent to the corresponding construction in the above-mentioned first embodiment.

The second embodiment configured as described above can bring about similar advantageous effects as in the above-mentioned first embodiment. In addition, the flange portion 9 can be shaped to have the protruding part 9a protruding beyond the outboard end face 6b of the outboard bushing 6 in the direction of the radius of the connector pin 8 as depicted in FIG. 3, because the outboard bushing 6 is arranged such that the outboard end face 6b is located remote from the outboard side wall 4b of the boom 4. The flange portion 9, therefore, does not come into contact with the outboard side wall 4b of the boom 4 even when the flange portion 9 has the protruding part 9a protruding beyond the outboard end face 6b of the outboard bushing 6 in the radial direction. The flange portion 9 can be provided with greater flexibility in shape, thereby further facilitating the fabrication.

Figure 4:
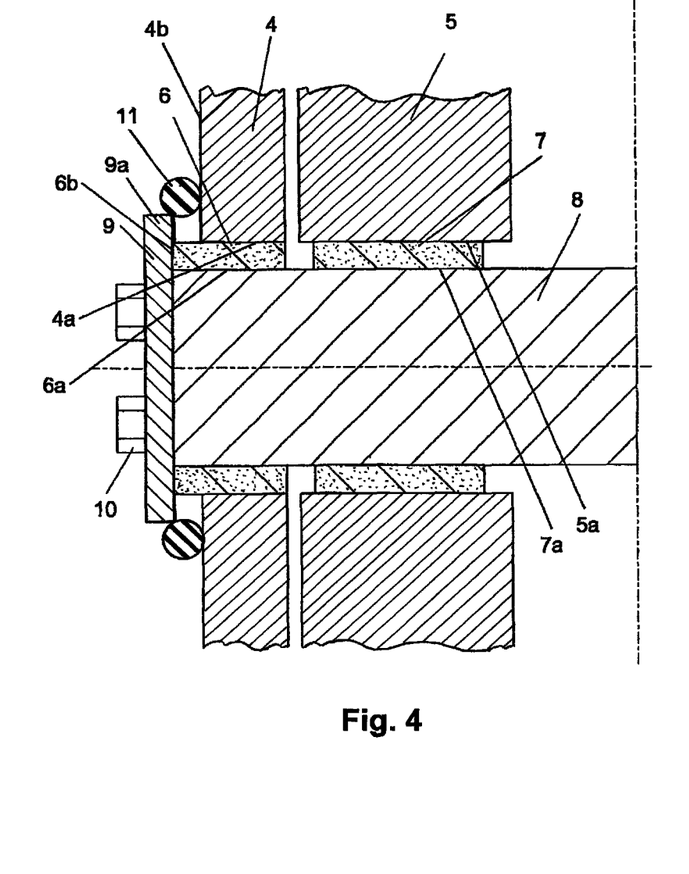
FIG. 4 is an enlarged fragmentary cross-sectional view depicting a third embodiment of the two-member connection structure according to the present invention.

FIG. 4 is an enlarged fragmentary cross-sectional view depicting a third embodiment of the two-member connection structure according to the present invention. It is to be noted that FIG. 4 also shows only a left half. Although illustration is omitted in the figure, a right half has a symmetrical structure to the left half with respect to a center line.

The third embodiment depicted in FIG. 4 is configured such that in addition to the construction of the second embodiment shown in FIG. 3, a seal member 11 is arranged to provide sealing between the protruding part 9a of the flange portion 9 and the outboard side wall 4b of the boom 4. The third embodiment configured as described above can bring about similar advantageous effects as the second embodiment, and in addition, can prevent, by the seal member 11, external dust and the like from penetrating into the area of sliding between the flange portion 9 and the outboard end face 6b of the outboard bushing 6 and also external dust and the like into the area of sliding between the hole 6a of the outboard bushing 6 and the connector pin 8, thereby making it possible to assure smooth pivotal movement of the boom 4 over a long term and to obtain a hydraulic excavator of high reliability.

In the first to third embodiments described above, the flange portion 9 is arranged integrally with the connector pin 8 by fastening the flange portion 9 on the end face of the connector pin 8 with the bolts 10. The present invention is, however, not limited to such a construction. These embodiments may each be configured, for example, with the flange portions 9 being arranged integrally on the end faces of the opposite end portions of the connector pin 8 by welding, respectively. Each embodiment may also be configured by subjecting one of the opposite end portions of the connector pin 8 to step-cut machining such that the flange portion 9 is formed with the same member as the connector pin 8.

The above-described first embodiment is configured with the outboard end face 6b of the outboard bushing 6 being flush with the outboard side wall 4b of the boom 4, and the second and third embodiments are configured with the outboard end face 6b of the outboard bushing 6 being located remote from the outboard side wall 4b of the boom 4 in the direction of the axis of the connector pin 8. The present invention is, however, not limited to such configurations. The embodiments may also be configured with the outboard end face 6b of the outboard bushing 6 being located inboard the outboard side wall 4b of the boom 4, in other words, being set in. When such a configuration is applied, for example, to the two-member connection structure for the arm and the bucket, the bolts 10 and flange portion 9 can be accommodated within the set-in portion to prevent them from coming into contact with earth, sand and the like so that the bolts 10 and flange portion 9 can be protected from wear or damage which would otherwise occur by their contact with earth, sand and the like.

LEGEND

1 Travel base
2 Revolving upperstructure
3 Front working mechanism
4 Boom (outboard member)
4a Pin hole
4b Outboard side wall
5 Arm (inboard member)
5a Pin hole
6 Outboard bushing
6a Hole
6b Outboard end face
7 Inboard bushing
7a Hole
8 Connection pin
9 Flange portion
9a Protruding part
10 Bolt
11 Seal member

The invention claimed is:

1. A two-member connection structure for a working machine, said structure being provided with outboard members to be arranged on the working machine, inboard members arranged inboard the respective outboard members, outboard bushings press-fitted in pin holes of the respective outboard members, inboard bushings press-fitted in pin holes of the respective inboard members, a connector pin inserted in holes of the outboard bushings and holes of the inboard bushings to connect the outboard members and inboard members for relative pivotal movement, and flange portions fixedly arranged on opposite end portions of the connector pin, respectively, to restrict slip-out of the connector pin from the outboard members and inboard members, wherein:

the connector pin is arranged rotatably relative to both of the outboard bushings and the inboard bushings, and the flange portions are disposed in slidable engagement with respective outboard end faces of the corresponding outboard bushings without being prevented from rotation relative to the outboard members, the outboard bushings are outboard bushings having self-lubricating properties at both of inboard circumferential surfaces thereof, which define the corresponding holes in which the connector pin is inserted, and the outboard end faces thereof, the outboard bushings are arranged such that the outboard end faces with the self-lubricating properties are located remote from outboard side walls of the corresponding outboard members in a direction of an axis of the connector pin, and the flange portions have parts protruding beyond the outboard end faces of the corresponding outboard bushings in a direction of a radius of the connector pin so as to be spaced apart from axially adjacent outboard side walls of the corresponding outboard members, and seal members are arranged to provide sealing between the protruding parts of the flange portions and the outboard side walls of the corresponding outboard members.

2. The structure according to claim 1, wherein the outboard bushings comprise an oil-impregnated sintered metal providing the self-lubricating properties.

* * * * *